United States Patent

[11] 3,539,082

| | | |
|---|---|---|
| [72] | Inventor | Torahiko Hayashi |
| | | 2-3 Nozawa-cho, Utsunomiya-shi, Japan |
| [21] | Appl. No. | 791,410 |
| [22] | Filed | Jan. 15, 1969 |
| [45] | Patented | Nov. 10, 1970 |
| [32] | Priority | Jan. 19, 1968 |
| [33] | | Japan |
| [31] | | 43/2,586 |

[54] METERED DISCHARGE APPARATUS FOR POWDERED MATERIAL
14 Claims, 10 Drawing Figs.

[52] U.S. Cl. ............................................... 222/232
[51] Int. Cl. ......................................... G01f 11/00
[50] Field of Search ...................................... 222/232, 233, 228

[56] References Cited
UNITED STATES PATENTS
760,394  5/1904  Heylman ..................... 222/233X
1,702,887  2/1929  Ayars ........................... 222/233

Primary Examiner—Stanley H. Tollberg
Attorney—Albert C. Johnston, Robert E. Isner, Lewis H. Eslinger and Alvin Sinderbrand ABSTRACT: An apparatus for repeatedly discharging small, accurately metered amounts of powdered material has a container for the material with a side aperture adjacent the bottom of the container, a feeder plate disposed adjacent the container bottom and formed with an end portion extending through the aperture to define a gap between a side edge of the plate and an adjacent portion of the container sidewall, and the feeder plate is cyclically moved so that, during part of each cycle, the gap is progressively narrowed in the direction toward the aperture and the plate edge defining the gap also moves along the latter in the same direction to propel a metered quantity of material through the aperture.

INVENTOR
TORAHIKO HAYASHI

BY
ATTORNEY

INVENTOR
TORAHIKO HAYASHI

BY
ATTORNEY

Patented Nov. 10, 1970

INVENTOR.
TORAHIKO HAYASHI

BY
ATTORNEY

METERED DISCHARGE APPARATUS FOR POWDERED MATERIAL

This invention relates to an apparatus for discharging very small and precisely determined or metered amounts of powdered material.

More specifically, this invention relates to an apparatus for discharging powdered material such as wheat flour, starch powder, powdered seasoning and so forth onto cakes, bread and the like in very small and precisely measured amounts at desired intervals.

Hitherto, it has been considered impossible to measure and supply very small amounts of powdered material because of the inherent characteristics of powdered materials and the sensitivity of such materials to various atmospheric conditions.

An example of a conventional device for measuring and discharging powdered material, is one which has wire gauze at the bottom of a container filled with powdered material, and which vibration of the device causes the powdered material to fall through the wire gauze in an amount regulated by the degree of the vibration. This device, however, is capable of supplying neither precisely measured nor very small amounts of powdered material. Furthermore, its performance varies greatly according to the type of powder, the humidity and other factors.

Accordingly, it is an object of this invention to provide an apparatus for discharging powdered material which avoids the foregoing disadvantages and discharges very small and precisely measured amounts of powdered material.

Another object is to provide an apparatus which facilitates the precise measurement and control of the amount of powdered material to be discharged.

Still another object is to provide an apparatus which is capable of delivering appropriate amounts of powdered material at consecutive intervals over an indefinite period.

A further object of this invention is to provide an apparatus which is capable of discharging powdered material in very small and precisely measured amounts irrespective of the kind of the powdered material and moisture conditions.

According to an aspect of this invention, a feeder plate is disposed adjacent the bottom of a material hopper or container having an aperture or port in its side wall through which one end of the feeder plate extends with a side edge of the plate cooperating with a portion of the hopper side wall to define a gap or passage therebetween extending to the aperture, and the feeder plate is cyclically moved in a manner to progressively narrow the gap in the direction toward the aperture during a part of each cycle and, simultaneously, to move the plate edge along the gap in the same direction so that a metered quantity of material in the hopper is propelled along the gap for discharge through the aperture.

In a preferred embodiment of the invention, the end of the feeder plate extending through the aperture is guided or constrained for reciprocating movement generally in the direction in which the aperture opens, and the cyclical movement of the plate is achieved by imparting repeated orbital or circulatory movements to the plate at a location thereon remote from its guided end.

With the mentioned arrangement, The particles of the powdered material are caused to roll along the narrow gap or passage between the side edge of the feeder plate and the side wall of the hopper in the direction of the movement of the feeder plate to the discharge aperture or port. Both the change of width of the gap and the timing of the circulatory movement of the feeder plate are so fixed as to enable the movement of the feeder plate to regulate or meter the amount of the powdered material to be discharged. Since the discharge of the powdered material is attained through the rolling movement of the particles of the powdered material caused by the feeder plate, the amount to be discharged is rarely affected by differences in the kind of the powdered material or by moisture conditions.

According to another feature of this invention, the powdered material left undischarged at one discharge cycle is carried under and around the feeder plate and eventually returns to the discharge position again. This operation makes it possible to discharge the powdered material at consecutive intervals over an indefinite period.

The regulation of the amounts of powdered material discharged by the apparatus according to this invention, is effected on one hand by adjustment of the eccentricity of a crank pin by which the orbital movements are imparted to the feeder plate and, on the other hand, by a shutter adjusted to vary the size of the port or aperture.

The above, and other objects, features and advantages of the invention, will be apparent in the following detailed description of an illustrative embodiment thereof, which is to be read in connection with the accompanying drawings, wherein.

Figure 1:
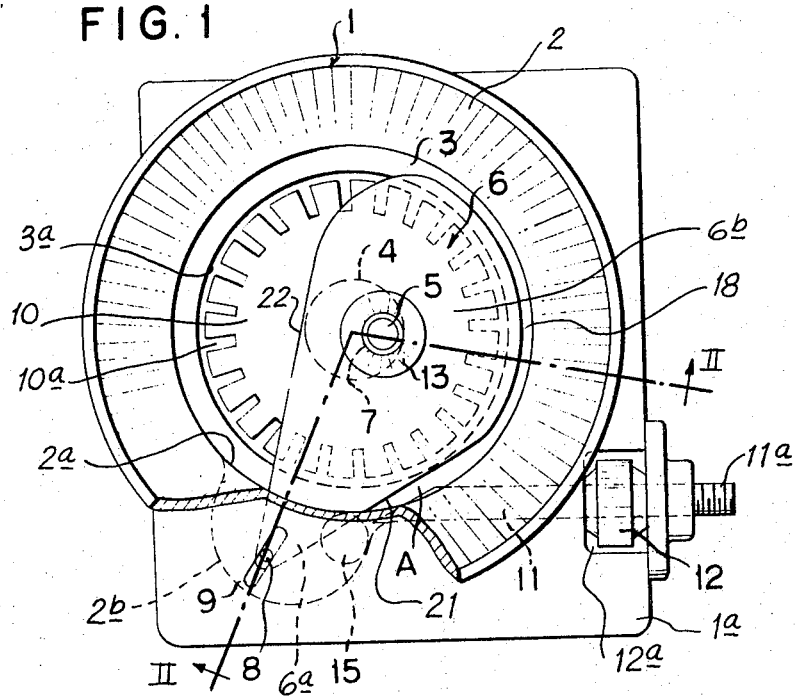
FIG. 1 is a plan view of an apparatus according to one embodiment of this invention, and which is shown partly broken away and in section.
Figure 2:
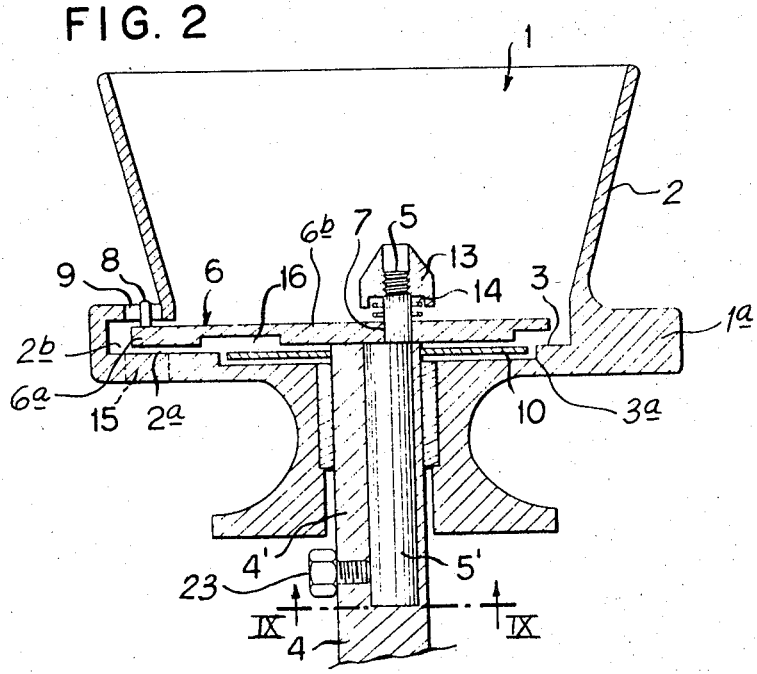
FIG. 2 is a sectional view taken along the line II-II on FIG. 1.

Referring to the drawings in detail, and initially to FIGS. 1 and 2, it will be seen that an apparatus in accordance with this invention, as there shown, comprises a hopper or container 1 for the material to be discharged which has an annular side wall 2 extending upwardly from a base 1a around the circular periphery of the bottom 3 of hopper 1 and having an aperture 2a in such side wall opening from the interior of hopper 1 into a laterally directed cavity 2b in base 1a. A feeder plate 6 is disposed within hopper or container 1 adjacent bottom 3 thereof and has an end portion 6a projecting through aperture 2a into cavity 2b, and such end portion 6a is guided or constrained for substantially rectilinear reciprocating movement generally in the direction in which aperture 2a opens, for example, as by a pin 8 extending upwardly from end portion 6a of the feeder plate and being slidably received in an elongated slot 9 formed in the roof of cavity 2b. Further, in accordance with this invention, repeated orbital or circulatory movements parallel to the plane of bottom 3 are imparted to feeder plate 6 at a portion 6b of the latter which is remote from its rectilinearly guided end portion 6a.

In the embodiment shown, the repeated orbital or circulatory movements are imparted to feeder plate 6 by means of a suitably rotated, vertical drive shaft 4 which extends upwardly through circular bottom 3 concentrically with the latter and which has a crank pin 5 extending axially from the upper end of shaft 4 and being eccentrically located with respect to the axis of rotation of shaft 4. The crank pin 5 is connected to feeder plate 6 at portion 6b of the latter in a manner so as to be rotatable relative to plate 6, for example, by extending crank pin 5 rotatably through a circular hole 7 provided in plate portion 6b. A nut 13 is screwed on the threaded upper end of crank pin 5 to compress a helical spring 14 which extends around the crank pin between nut 13 and plate 6 so as to hold the latter downwardly against the upper end surface of shaft 4 without undue frictional resistance to rotation of shaft 4 and crank pin 5 relative to the feeder plate. It will be apparent that, as shaft 4 is rotated and feeder plate 6 is held against rotation by the engagement of pin 8 in slot 9, the plate portion 6b engaged by crank pin 5 will have orbital movements imparted thereto about the axis of shaft 4, while end portion 6a of the feeder plate will be reciprocated rectilinearly in the direction determined by slot 9 which, of course, has a suitable length to accommodate the reciprocation that results from the orbital movement.

Figure 9:
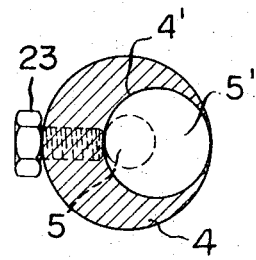
FIGS. 9 and 10 are enlarged sectional views taken along the line IX-IX on FIG. 2 and which show two different relative positions of inner and outer shafts for adjusting the extent of movement of the feeder plate.
Figure 10:
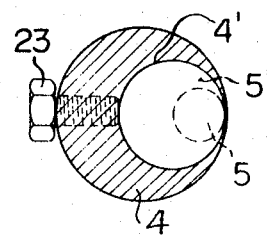
Figure 8:
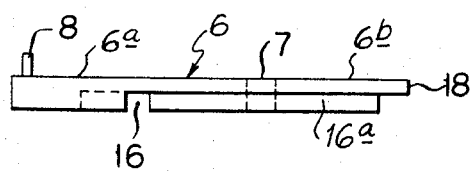
FIG. 8 is a side elevational view of the feeder plate.

In order to permit adjustment of the eccentricity of crank pin 5 with respect to the axis of shaft 4, and hence adjustment of the radius of the orbital movements imparted to the feeder plate, crank pin 5 may extend eccentrically from the upper end of an inner or adjusting shaft 5' which is turnably received in a cylindrical bore 4' opening at the upper end of shaft 4 and extending parallel to the axis of the latter, but offset or eccentrically located with respect to such axis. Thus, by turning shaft 5' relative to shaft 4, it is possible to adjust the eccentricity of crank pin 5 relative to the axis of shaft 4 from a position of maximum eccentricity (FIG. 10) to a position of minimum eccentricity (FIG. 9). In order to hold shaft 5' against rotation relative to shaft 4 at any desired relative position, and hence to retain the desired eccentricity of crank pin 5 with respect to the axis of shaft 4, a set screw 23 extends through shaft 4 into clamping engagement with shaft 5' in bore 4'.

Figure 7:
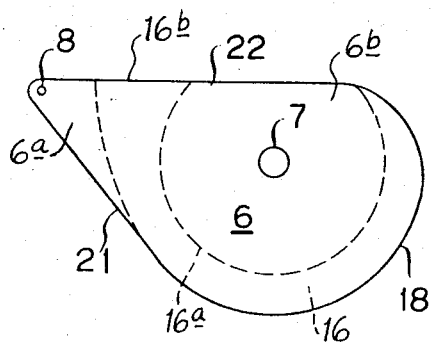
FIG. 7 is a plan view of the feeder plate.

Referring in detail to FIG. 7, it will be seen that feeder plate 6 is preferably formed with a relatively short straight side edge 21 and an opposite relatively long straight side edge 22 converging in the direction toward end portion 6a, and an arcuate edge 18 connecting the ends of straight edges 21 and 22 that are remote from end portion 6a. Further, hole 7 which receives crank pin 5 is located so that its distance from straight edge 22, measured normal to the latter, is substantially smaller than the radial distance from hole 7 to arcuate edge 18. The position of hole 7 with respect to arcuate edge 18 and the curvature of the latter are selected so that, when shaft 5' is adjusted relative to shaft 4 so as to provide the maximum possible eccentricity of crank pin 5 relative to the axis of shaft 4 and the latter is turned to the position (FIGS. 1 and 5) where arcuate edge 18 makes its closest approach to the bottom of hopper side wall 1, there remains an elongated gap A which extends to aperture 2a between, on the one hand, straight side edge 21 and the contiguous portion of arcuate edge 18 and, on the other hand, the adjacent portion of the bottom of side wall 2. The underside of feeder plate 6 is preferably formed with an arcuate passageway 16 having an inner wall surface 16a that may be concentric with hole 7, as shown, and which opens radially outward along arcuate edge 18 of the plate and also opens endwise at straight side edge 22, as at 16b (FIG. 7).

Referring again to FIGS. 1 and 2, it will be seen that the bottom 3 of hopper 1 is formed with a shallow circular recess 3a concentric with the axis of shaft 4 and which receives a rotated circular plate or disk 10 that is concentrically secured on shaft 4 and disposed immediately under feeder plate 6. The rotated circular plate 10 is diametrically dimensioned so that its peripheral portion will extend under at least a part of annular passageway 16 in all of the positions of plate 6 shown on FIGS. 3—6, and further so that the peripheral portion of plate 10 will project beyond straight edge 22 of plate 6 in all of such positions. Further, the periphery of rotated circular plate 10 is preferably formed with recesses 10a (FIG. 1) spaced apart therealong and which open at least at the upper surface of plate 10. As shown, such recesses 10a may be constituted by spaced apart radially extending notches cut in the peripheral portion of plate 10, and which thus open at the bottom and edge of the plate as well as at the top thereof.

As shown particularly on FIG. 1, the apparatus according to this invention further preferably has an elongated member 11 slidable longitudinally in a suitable passage formed in the base 1a of hopper 1 and opening through the bottom portion of side wall 2 adjacent a side of aperture 2a so that the inner end of member 11 is movable laterally across aperture 2a adjacent straight edge 21 of feeder plate 6 so as to vary the effective size of aperture 2a at the side of the latter to which gap A extends. In order to effect longitudinal movement of member 11 for varying the effective size of aperture 2a, as described, the outer end portion of member 11 may be formed as a screw 11a engaged by an adjusting nut 12 which is constrained against axial movement in a recess 12a of the base 1a. Finally, a discharge opening or port 15 for the powdered material extends downwardly from cavity 2b through base 1a and is preferably located (FIG. 1) adjacent the side of aperture 2a to which gap A extends.

Figure 3:
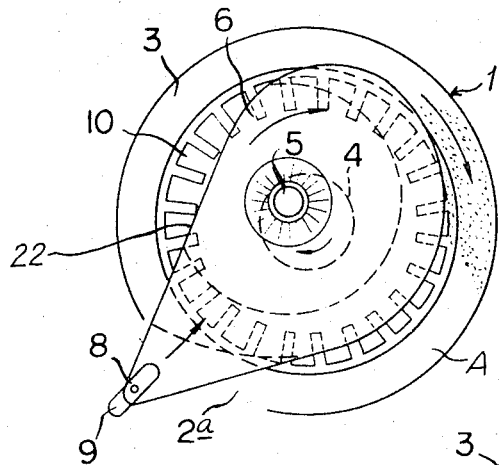
FIGS. 3 to 6 are schematic views illustrating the positions of the feeder plate at successive phases of an operating cycle thereof.
Figure 4:
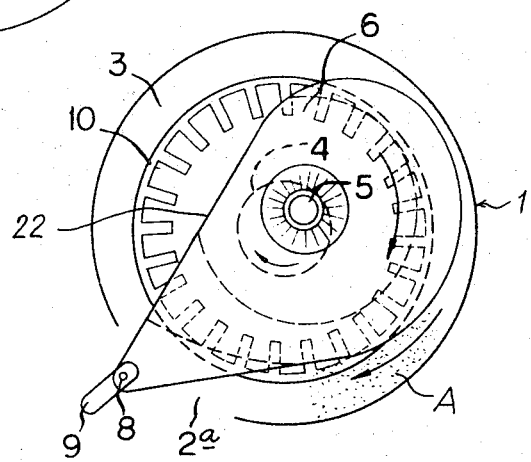
Figure 5:
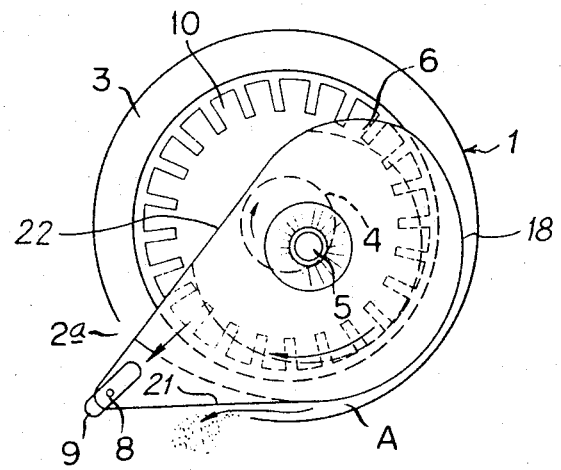
Figure 6:
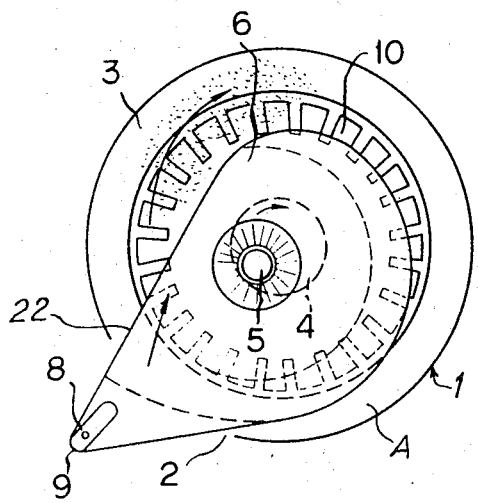

The above described apparatus according to this invention operates as follows:

Shaft 4 is rotated in the clockwise direction, as viewed on FIGS. 1 and 3—6, that is, in the direction arcuate edge 18 extends from relatively long straight edge 22 to relatively short straight edge 21 of feeder plate 6. Starting with shaft 4 in the position shown on FIG. 3, it will be seen that powdered material at the bottom of the supply thereof in hopper 1 will collect in gap A and that, as shaft 4 moves successively from the position of FIG. 3 through the position of FIG. 4 to the position shown on FIG. 5, the width of gap A will be progressively narrowed in the direction toward aperture 2a. During such progressive narrowing of the gap A, the straight edge 21 and the contiguous portion of the arcuate edge 18 of plate 6 will move along gap A in the direction toward aperture 2a, whereby a quantity of the powdered material will be propelled from gap A through aperture 2a, as indicated on FIG. 5, so as to fall from cavity 2b through the discharge opening or port 15. The amount of the powdered material that is propelled through aperture 2a for discharge at opening or port 15 is determined both by the difference between the maximum and minimum widths of gap A, as indicated at FIGS. 3 and 5, respectively, and also by the extent of the movement of the straight edge 21 of plate 6 along such gap. It will be seen that both of the foregoing factors controlling the amount of powdered material discharged during each revolution of shaft 4 are dependent upon the eccentricity of crank pin 5 with respect to the axis of shaft 4. The amount of powdered material discharged during each revolution of shaft 4 is further determined by the setting of the member 11 which controls the size or effective lateral extent of aperture 2a at the side of the latter adjacent straight edge 21 of the feeder plate.

It will be apparent that, during each of the successive revolutions of shaft 4, the progressive narrowing of gap A and the movement of plate edge 21 along such gap will be constant so long as the eccentricity of crank pin 5 remains fixed. Therefore, so long as adequate amounts of powdered material are supplied to gap A during successive revolutions of shaft 4, constant amounts of powdered material will be discharged through the port or opening 15 of the apparatus during successive revolutions of shaft 4 that is, during successive operating cycles of the apparatus.

It should be noted that the described movement of plate edge 21 along gap A to contribute to the propelling of powdered material along such gap through aperture 2a results in a rolling motion of the particles of powdered material. Such rolling motion avoids clogging of the powdered material in the gap A and sticking of the powdered material to either the edge 21 of plate 6 or to the adjacent side wall of the hopper regardless of the kind of powdered material being discharged or dispensed and also regardless of the moisture content thereof or the atmospheric conditions.

As mentioned above, the uniform metering of the discharged material, that is, the discharge of constant amounts of the material during successive operating cycles, requires that a sufficient amount of the powdered material reach gap A during successive cycles. In the described apparatus, the foregoing requirement is achieved by the cooperative action of the rotated circular plate 10 with the annular passage 16 in the underside of feeder plate 6. More specifically, at the end of each operating cycle, the powdered material that has not been discharged from gap A is guided toward circular plate 10 by the sliding action of plate 6 and is carried away by the rotation of plate 10 through passageway 16 so as to exit from the latter at the side of plate 6 constituted by its straight edge 22 (FIG. 6) and then to be propelled circularly by plate 10 back to the entrance to gap A, as indicated on FIG. 3.

The following are the results of experiments which have been conducted with an apparatus, as described above, and in which the thickness of feeder plate 6 is 10 mm., the inner diameter of hopper 1, at its bottom 3, is 80 mm., and the eccentricity of the crank pin 5 is 5 mm.:

When member 11 was set to provide a 2 mm. spacing from the inner end of member 11 to the adjacent side edge 21 of feeder plate 6 for the closest approach of edge 21 to member 11, an average of 0.2 grams of powdered material was discharged from the apparatus for each revolution of the shaft 4. When member 11 was adjusted to increase the mentioned spacing to 10 mm., an average amount of 0.3 grams of powdered material was discharged from the apparatus for each revolution of shaft 4. When the eccentricity of crank pin 5 was successively set at 2.5 mm., 5 mm. and 10 mm., and in each case the member 11 was adjusted to provide a minimum spacing of 2 mm. between its inner end and the adjacent straight edge 21 of the feeder plate, 0.1 grams, 0.2 grams and 0.4 grams, respectively, of the powdered material were discharged for each revolution of shaft 4.

From the foregoing, it is apparent that an apparatus embodying the invention makes it possible to measure or meter and discharge small and precise amounts of powdered materials through the use of a relatively simple mechanism, and without limitation as to the kinds of powdered material to be discharged or as to the atmospheric conditions.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention.

I claim:

1. An apparatus for repeatedly discharging metered amounts of powdered material, comprising a container for the material to be discharged that includes a bottom and a side wall extending upwardly from the periphery of said bottom and having an aperture therein opening from the interior of said container adjacent said bottom, a feeder plate disposed in said container adjacent said bottom and having an end portion projecting through said aperture, means guiding said end portion of the feeder plate for substantially rectilinear reciprocating movements of said end portion generally in the direction in which said aperture opens, means to impart repeated orbital movements to said feeder plate at a portion thereof which is within said container and remote from said end portion of the plate, said feeder plate having an edge portion which cooperates with an adjacent portion of said side wall to define a gap therebetween extending to said aperture, and said edge portion of the plate moving along said gap in the direction toward said aperture and progressively narrowing said gap during a part of each of said orbital movements to propel a metered amount of powdered material along said gap and out of said container through said aperture.

2. An apparatus according to claim 1, in which said means to impart repeated orbital movements includes a rotated drive shaft and a crank pin extending from said shaft and being eccentrically located with respect to the axis of rotation of said shaft, said crank pin being connected to said feeder plate so as to be rotatable relative to the latter at said portion of the plate remote from said end portion.

3. An apparatus according to claim 2, further comprising means for adjusting the eccentricity of said crank pin with respect to said axis of the drive shaft.

4. An apparatus according to claim 3, in which said means for adjusting the eccentricity of said crank pin includes an axial bore in said drive shaft which is eccentric with respect to said axis of rotation of the drive shaft, an adjusting shaft turnable in said bore and having said crank pin eccentrically located on an end of said adjusting shaft so as to extend from said drive shaft with the eccentricity of said crank pin relative to said axis of rotation of the drive shaft being varied in response to turning of said adjusting shaft relative to said drive shaft, and means to secure said adjusting shaft within said bore of the drive shaft.

5. An apparatus according to claim 1, in which means are provided for adjusting the size of said aperture.

6. An apparatus according to claim 5, in which said means for adjusting the size of the aperture includes a member movable laterally across said aperture adjacent said edge portion of the feeder plate.

7. An apparatus according to claim 1, in which a rotated plate is disposed below said feeder plate within said container, and said feeder plate has an arcuate passageway in its underside that confronts said rotated plate and opens laterally at least in part at said edge portion of the feeder plate so that powdered material is carried to and from said gap through said passageway by means of said rotated plate.

8. An apparatus according to claim 1, in which said rotated plate has an axis of rotation that is concentric with the center of said orbital movements imparted to the feeder plate.

9. An apparatus according to claim 8, in which said means to impart orbital movements to the feeder plate includes a rotated drive shaft having said rotated plate secured thereon, a crank pin connected with said feeder plate so as to be rotatable relative to the latter, and means mounting said crank pin on said drive shaft parallel to the axis of rotation of the latter and with an adjustable eccentricity of said crank pin relative to said axis of rotation.

10. An apparatus according to claim 7, in which said rotated plate has recesses spaced apart along its periphery and opening at least at the upper surface of the rotated plate.

11. An apparatus according to claim 1, in which said bottom of the container is substantially circular, the center of said orbital movements imparted to the feeder plate is substantially concentric with the center of said circular bottom, said portion of the feeder plate to which the orbital movements are imparted is relatively wide and has an arcuate edge part of which is included in said edge portion of the feeder plate, and said feeder plate tapers in width from said relatively wide portion to said end portion extending through the aperture.

12. An apparatus according to claim 11, in which a rotated circular plate is provided underneath said feeder plate and extends beyond a side edge portion of said feeder plate which is opposite to the first mentioned edge portion of the latter, and said feeder plate has an arcuate passageway in its undersurface, said passageway opening at its radially outer side along said arcuate edge of the feeder plate and also opening endwise at said opposite side edge portion of the feeder plate.

13. An apparatus according to claim 1, in which said means guiding said end portion of the feeder plate includes an elongated slot extending in said direction and a pin slidable along said slot.

14. An apparatus according to claim 1, in which said aperture opens from said interior of the container into a cavity extending laterally outward therefrom, and said cavity has a discharge opening for the material in the bottom of said cavity.